W. P. GORDON.
COASTER BRAKE.
APPLICATION FILED AUG. 16, 1911.

1,022,937.

Patented Apr. 9, 1912.

Witnesses:
Christ Feinle, Jr.
T. H. Hosler

Inventor,
Wiley P. Gordon.
By Victor J. Evans,
Attorney.

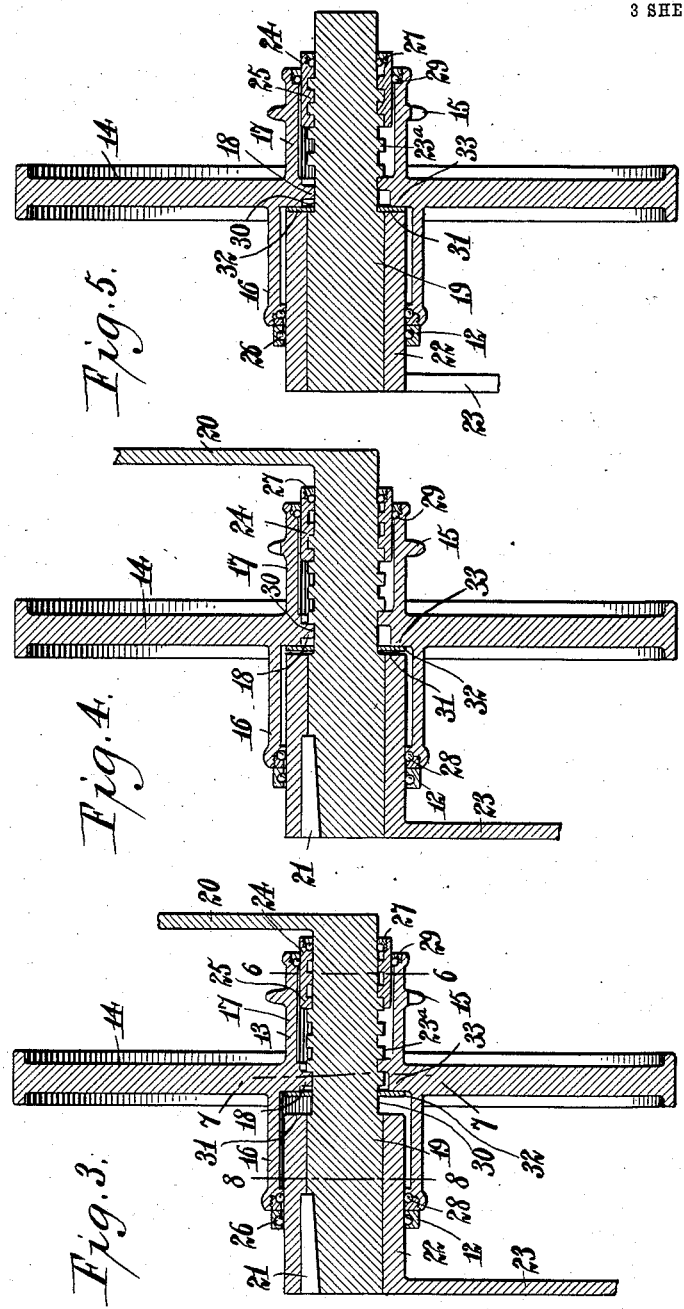

W. P. GORDON.
COASTER BRAKE.
APPLICATION FILED AUG. 16, 1911.

1,022,937.

Patented Apr. 9, 1912.

3 SHEETS—SHEET 3.

Witnesses:
Christ Feinle, Jr.
H. H. Hoster

Inventor,
Wiley P. Gordon.
By Victor J. Evans,
Attorney.

UNITED STATES PATENT OFFICE.

WILEY P. GORDON, OF LAKELAND, FLORIDA.

COASTER-BRAKE.

1,022,937.	Specification of Letters Patent.	Patented Apr. 9, 1912.

Application filed August 16, 1911. Serial No. 644,306.

*To all whom it may concern:*

Be it known that I, WILEY P. GORDON, a citizen of the United States, residing at Lakeland, in the county of Polk and State of Florida, have invented new and useful Improvements in Coaster-Brakes, of which the following is a specification.

An object of the invention is to provide a coaster brake particularly adaptable for use on bicycles and similar vehicles of propulsion to control the propulsion of the vehicle and assist in stopping the same.

Among other features my invention embodies a device operable in connection with the usual cranks on a bicycle or the like, so that the operator in rotating the cranks to propel the vehicle can retain the cranks in stationary position, thus permitting the vehicle to coast and also bear rearwardly on the cranks to apply a brake and stop the vehicle.

For the purpose mentioned, use is made of a sleeve mounted to revolve between the hangers of a vehicle, a balance wheel mounted on the sleeve, a sprocket wheel mounted on the sleeve and having connection with the transmission mechanism of the vehicle, a shaft mounted within the said sleeve and slidable longitudinally thereof, the said shaft being adapted to operate with or independently of the said sleeve to permit of the operator controlling the propulsion of the vehicle.

Reference is to be had to the accompanying drawings constituting a part of this specification, in which similar characters of reference denote corresponding parts in all the views, and in which—

Figure 6:
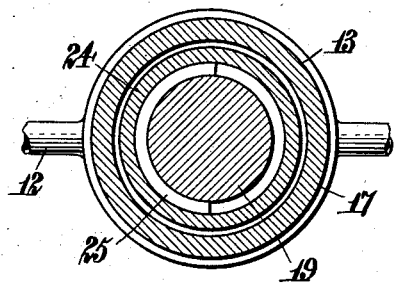
Figure 7:
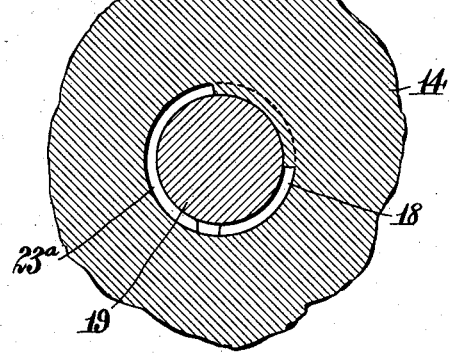
Figure 8:
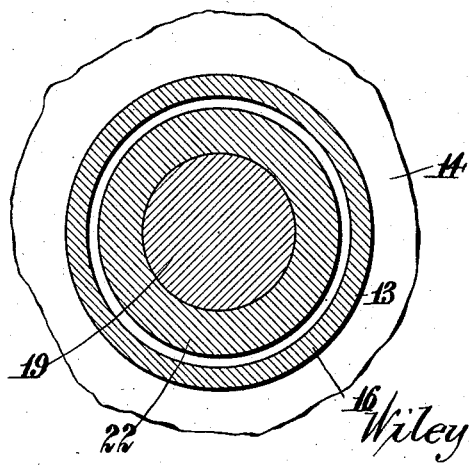

Figure 1 is a side elevation of a bicycle showing my device thereon. Fig. 2 is a horizontal sectional view taken on the line 2—2 in Fig. 1, looking in the direction of the arrow. Fig. 3 is a vertical sectional view taken on the line 3—3 in Fig. 1, the various parts of my device being in position for propelling the bicycle forwardly. Fig. 4 is a sectional view similar to the view shown in Fig. 3, the various parts of my device being positioned for coasting. Fig. 5 is a sectional view similar to the sectional view shown in Fig. 3, the various parts of my device being shown in position for applying the brakes on the bicycle. Fig. 6 is a vertical sectional view taken on the line 6—6 in Fig. 3. Fig. 7 is a vertical sectional view taken on the line 7—7 in Fig. 3. Fig. 8 is a vertical sectional view taken on the line 8—8 in Fig. 3.

Referring more particularly to the various views, I provide a bicycle 10 having a frame 11 provided with hangers 12 and revolubly mounted between the hangers 12 is a sleeve 13 provided with an integral balance wheel 14 and a sprocket wheel 15, the said sleeve consisting of an enlarged tubular portion 16 on one side of the balance wheel 14 and a reduced portion 17 on the other side of the balance wheel 14, the said sleeve 13 being provided on its inner periphery, at the inner terminus of the portions 16 and 17, with a peripherally extending tooth 18.

Revolubly mounted within the sleeve 13 is a crank shaft 19 having a crank 20 formed at one end thereof and secured to the other end of the shaft 19 by means of a key 21 is a collar 22 provided with a crank 23 extending in an opposite direction to the crank 20, as will be readily understood. The crank shaft 19 is provided with a threaded portion 23ª, adapted to operate over the tooth 18 and secured to one of the hangers 12 and extending within the sleeve 13 to encircle one end of the crank shaft 19 is a sleeve 24 provided on the inner periphery thereof with teeth 25 over which the threaded portion 23ª of the crank shaft 19 is adapted to operate.

Suitable ball bearings 26, 27 are mounted in the hangers 12 to encircle the collar 22 and an end of the crank shaft 19 respectively, thus permitting the collar 22 secured to the crank shaft 19, and the crank shaft 19 to operate freely relatively to the hangers 12. Mounted to encircle the collar 22 and the toothed sleeve 24 are ball bearings 28, 29 respectively, the said ball bearings 28, 29 being mounted within the sleeve 13 to permit of the sleeve 13 rotating freely relatively to the collar 22 and the shaft 19. A reduced portion 30 is provided between the collar 22 and the threaded portion 23ª, the tooth 18 being adapted to operate freely in the mentioned space and the collar 22 is provided with an end 31 adapted to abut against a brake ring 32 secured against a flange 33 integrally formed on the sleeve 13 on the inner side thereof. The hangers 12 terminate in their rear ends in turn buckles 34 having connection with extension hangers 35 secured to the frame 11 of the bicycle, the said hangers 12 and extension hangers 35 being in threaded engagement with the turn buckles for a purpose that will be hereinafter more fully disclosed. Mounted at the point of connection with the frame 11 and the extension hangers 35 is a sprocket 36 over which is passed a chain 37 mounted to encircle the sprocket wheel 15 on the sleeve 13, this construction being the usual transmission mechanism of manually operated bicycles.

Assuming that the various parts of my device are in the position shown in Fig. 3, when it is desired to propel the bicycle forwardly, the cranks 20 and 23 are operated, thus rotating the shaft 19 and causing the sleeve 13 to revolve inasmuch as the tooth 18 is in locked engagement with the threaded portion 23ª of the shaft 19 as will be readily understood. Now when it is desired to coast, the cranks 20 and 23 are brought to a stationary position, thus retaining the shaft 19 against rotation and as the sleeve 13 is revolving with the fly wheel 14, the threaded portion 23ª will operate over the tooth 18, thus disengaging the tooth 18 from the threaded portion 23ª and the tooth will then be disposed in the space 30 as shown in Fig. 4, thus permitting the sleeve to rotate freely without any movement of the shaft 19. Now when it is desired to stop the bicycle, the cranks 20 and 23 are moved backwardly, thus moving the threaded portion 23ª of the shaft 19 into engagement with the teeth 25 on the inner periphery of the sleeve 24. As the threaded portion 23ª operates over the teeth 25, the end 31 of the collar 22 will be brought against one side of the brake ring 32 mounted to encircle the shaft 19 and abutting against the flange 33, the mentioned frictional engagement of the end 31 of the collar 22 with the brake ring 32 constituting a brake for retarding the rotation of the sleeve and when the threaded portion 23ª has operated over all of the teeth 25 on the sleeve 24, the mentioned end 31 of the collar 22 will frictionally engage the brake ring 32 to such an extent as to cause the sleeve 13 to become stationary, thus bringing the bicycle to a standstill. When it is desired to restart the bicycle the hangers 20 and 23 are rotated forwardly, thus releasing the threaded portion 23ª from engagement with the teeth 25 on the sleeve 24 and by exerting a slight transverse pressure on the crank 20, the tooth 18 will be moved into engagement with the threaded portion 23ª, thus locking the sleeve 13 with the shaft 19 and causing the bicycle to move forwardly as mentioned heretofore. By manipulating the turn buckles 34, the chain 37 can be slightly adjusted to tighten or loosen the same relatively to the sprockets 15 and 36.

The fly wheel 14 provided on the sleeve 13 tends to obviate any vibration that may be produced in the operation of my device and although I have described my coaster brake as applied to a chain bicycle, it will be also understood that the same may be used on chainless bicycles.

It will be also seen that my device can be readily used in connection with various kinds of vehicles and although for the purpose of describing the coaster brake I have shown a particular construction thereof, the scope of the invention is defined in the claims and various departures can be made in the description without departing from the spirit of the invention.

Having thus fully described the invention, what I claim as new, is:—

1. A coaster brake comprising a shaft mounted to revolve between the hangers of a vehicle, a threaded portion formed on the said shaft, a space being provided adjacent one end of the threaded portion, a collar keyed to the said shaft and having the inner end thereof adjacent the said space, a sleeve mounted to loosely encircle the said shaft and provided with a flange adapted to be engaged by the inner end of the said collar, a tooth formed on the said flange and adapted for engagement with the threaded portion of the said shaft, a toothed sleeve rigidly secured to one of the said hangers and mounted to encircle the said shaft, the teeth on the said sleeve being adapted for engagement with the threaded portion of the said shaft and means for connecting the tooth sleeve to the transmission gear of the vehicle.

2. A coaster brake comprising a shaft mounted to revolve between the hangers of a vehicle, a threaded portion formed on the said shaft, a space being provided adjacent one end of the threaded portion, a collar keyed to the said shaft and having the inner end thereof adjacent the said space, a sleeve mounted to loosely encircle the said shaft and provided with a flange adapted to be engaged by the inner end of the said collar, a tooth formed on the said flange and adapted for engagement with the threaded portion of the said shaft, a toothed sleeve rigidly secured to one of the said hangers and mounted to encircle the said shaft, the teeth on the said sleeve being adapted for engagement with the threaded portion of the said shaft, means for connecting the tooth sleeve to the transmission gear of the vehicle and a balance wheel formed on the first mentioned sleeve to revolve therewith between the said hangers.

3. A coaster brake comprising a shaft mounted to revolve between the hangers of a vehicle, a threaded portion formed on the said shaft, a space being provided adjacent one end of the threaded portion, a collar keyed to the said shaft and having the inner end thereof adjacent the said space, a sleeve mounted to loosely encircle the said shaft and provided with a flange adapted to be engaged by the inner end of the said collar, a tooth formed on the said flange and adapted for engagement with the threaded portion of the said shaft, a toothed sleeve rigidly secured to one of the said hangers and mounted to encircle the said shaft, the teeth on the said sleeve being adapted for engagement with the threaded portion of the said shaft, means for connecting the tooth sleeve to the transmission gear of the vehicle and crank shafts rigidly secured to the said shaft for operating the same.

4. A coaster brake comprising a shaft mounted to revolve between the hangers of a vehicle, a threaded portion formed on the said shaft, a space being provided adjacent one end of the threaded portion, a collar keyed to the said shaft and having the inner end thereof adjacent the said space, a sleeve mounted to loosely encircle the said shaft and provided with a flange adapted to be engaged by the inner end of the said collar, a tooth formed on the said flange and adapted for engagement with the threaded portion of the said shaft, a toothed sleeve rigidly secured to one of the said hangers and mounted to encircle the said shaft, the teeth on the said sleeve being adapted for engagement with the threaded portion of the said shaft, means for connecting the tooth sleeve to the transmission gear of the vehicle, a balance wheel formed on the first mentioned sleeve to revolve therewith between the said hangers and crank shafts rigidly secured to the ends of the said shaft for operating the same.

In testimony whereof I affix my signature in presence of two witnesses.

WILEY P. GORDON.

Witnesses:
  I. E. SWANSEN,
  J. F. GREEN.

---

Copies of this patent may be obtained for five cents each, by addressing the "Commissioner of Patents, Washington, D. C."